US009086839B2

(12) United States Patent
Griffin

(10) Patent No.: US 9,086,839 B2
(45) Date of Patent: Jul. 21, 2015

(54) MULTIPLE USER COMPUTING METHOD AND SYSTEM FOR SAME

(75) Inventor: Timothy E Griffin, Calgary (CA)

(73) Assignee: Userful Corporation, Calgary, Alberta (CA)

( * ) Notice: Subject to any disclaimer, the term of this patent is extended or adjusted under 35 U.S.C. 154(b) by 151 days.

(21) Appl. No.: 13/995,164

(22) PCT Filed: Dec. 15, 2011

(86) PCT No.: PCT/CA2011/001365
§ 371 (c)(1),
(2), (4) Date: Jun. 17, 2013

(87) PCT Pub. No.: WO2012/079153
PCT Pub. Date: Jun. 21, 2012

(65) Prior Publication Data
US 2013/0283193 A1    Oct. 24, 2013

Related U.S. Application Data

(60) Provisional application No. 61/423,097, filed on Dec. 15, 2010.

(51) Int. Cl.
*G06F 3/048*     (2013.01)
*G06F 3/14*      (2006.01)

(52) U.S. Cl.
CPC .................. *G06F 3/1446* (2013.01)

(58) Field of Classification Search
CPC ....................................... G06F 3/048
USPC ............................................. 715/761
See application file for complete search history.

(56) References Cited

U.S. PATENT DOCUMENTS

| | | | | |
|---|---|---|---|---|
| 5,899,995 | A  * | 5/1999 | Millier et al. | 1/1 |
| 6,654,784 | B1 * | 11/2003 | Wei | 709/203 |
| 7,398,295 | B2 * | 7/2008 | Shoroff et al. | 709/204 |
| 2006/0284785 | A1 * | 12/2006 | Bitterlich | 345/1.1 |
| 2007/0027960 | A1 * | 2/2007 | De Leon | 709/217 |
| 2010/0085317 | A1 * | 4/2010 | Park et al. | 345/173 |

* cited by examiner

*Primary Examiner* — David Phantana Angkool

(57) ABSTRACT

A method of multi-user computing comprises detecting, by processing structure of a host computing device running a first operating system, devices in communication with the host computing device for supporting an additional user. The devices comprise a multiseat connection device, and at least one peripheral input device and at least one peripheral display device. The devices are configured to enable a user to interact with the host operating system. The method further comprises generating, by the processing structure, an instance of a second operating system; assigning, by the processing structure, the multiseat connection device, and supporting devices housed therein to the second operating system; and configuring, by the processing structure, device drivers running within the second operating system for supporting any of the supporting devices and the peripheral devices in communication with the multiseat connection device, for enabling the additional user to use the second operating system.

24 Claims, 14 Drawing Sheets

MULTIPLE USER COMPUTING METHOD AND SYSTEM FOR SAME

FIELD OF THE INVENTION

The present invention relates generally to multi-user computing, and in particular to using several operating systems to achieve this.

BACKGROUND OF THE INVENTION

Desktop computers are expensive and difficult to maintain and generally offer far more computing power than is needed by a single user. The ability to share this computing power by locally connecting extra users to this PC is desirable.

Simultaneous sharing of a single personal computer via a single running instance of the operating system by multiple locally connected users is also known and growing in popularity. Companies such as Userful, Ncomputing, Windows MultiPoint Server 2010, have successfully commercialized this technology. In these situations several keyboards mice and monitors are locally connected to a single personal computer and groupings of these devices are created such that multiple users can independently operate these groupings. Generally such sharing is achieved by running a single instance of a single operating system that is used to create and regulate the assignment and grouping of devices as they are added or removed from the system.

Connecting multiple input devices (e.g., keyboards and mice) and multiple output devices (e.g., monitors) to a single computer for use by a single user has also been a common application for a long period of time. Many computers have connections to support two or more monitors. Typically this is used to create an "Extended desktop" that spans across multiple monitors. The user chooses which monitors to use for a specific task and drags windows from one monitor to another as needed. With the advent of USB keyboards and mice it is easy to connect two or more keyboards to a computer. A laptop user might employ a second full-sized keyboard and mouse for personal convenience in input and output.

The concept of a Virtual Machine, VM, which forms part of this invention, has considerable history. First conceived in the 1960s by IBM as a way to allow multiple users to employ a small part of a main frame computer as if they had their own computer (machine), it has since been developed as a method of allowing a second operating system (Guest OS) to run simultaneously with the primary OS of the computer (Host OS). While the Guest OS appears to the user to be running independently it is at a basic level under the control of the Host OS. Many modern virtual machines (e.g., VMWare and VirtualBox) allow Host OS users to allocate and dedicate specific devices from the Host PC (e.g., a USB storage drive) to be accessible and controlled by the Guest OS. On a desktop PC, VM software was traditionally run to enable a single user of the Host OS to switch between the various running Guest OS instances. With VM software a single user sitting in front of their console would only be able to interact with one operating system at a time, although they could switch between these active operating systems.

In case an individual has licensed an operating system for a home PC or laptop, it would be helpful to have an easy way to share that computer with a visitor or family member by running a second open-source operating system, which when run as an application on the Host OS would provide a Guest OS for one or more locally connected additional users. The proposed invention offers a simple and convenient way to accomplish this at minimum expanse while completely preserving the integrity of the Host OS and any files it may contain.

SUMMARY OF THE INVENTION

Accordingly, in one aspect, there is a method of multi-user computing comprising detecting, by processing structure of a host computing device running a host operating system and presenting graphical output of the host operating system in a host desktop environment on at least one display device, at least one peripheral input device in communication with the host computing device; allocating, by the processing structure, a designated area of the host desktop environment for displaying a guest window; presenting, by the processing structure, a guest window within the designated area; and assigning, by the processing structure, input received from the at least one peripheral input device to the guest window, such that the input from the at least one peripheral input device does not affect a remaining area of the host desktop environment that lies outside of the designated area, the remaining area of the host desktop environment and the guest window being displayed simultaneously.

In one embodiment, the graphical output associated with the input received from the at least one peripheral input device is confined to within boundaries of the guest window.

In another embodiment, graphical output associated with input associated with the host desktop environment is not displayed within boundaries of the guest window.

In still another embodiment, the method further comprises following the detecting: allocating, by the processing structure, a reconfigured area of the at least one display device for displaying the host desktop environment.

In still another embodiment, the processing structure is running a guest operating system simultaneously with the host operating system, the graphical output of the guest operating system being presented in the guest window. In a further embodiment, the secondary operating system is an operating system that is configured for receiving the input as mouse input or touch input. In a still further embodiment, the secondary operating system is further configured to be operated without a keyboard. In another embodiment, the secondary operating system is configured to present a browser within the guest window.

In still another embodiment, the method further comprises upon termination of a guest user session, deleting, by the processing structure, the guest window being displayed on the at least one display device; and allocating, by the processing structure, an entirety of the at least one display device for displaying the host desktop environment.

In still another embodiment, the method further comprises launching the guest window upon user input. In a further embodiment, the method further comprises checking, by the processing structure, a registry of predefined peripheral input devices; determining, by the processing structure, if the at least one peripheral input device detected during the detecting comprises at least one predefined peripheral input device: and assigning the at least one predefined peripheral input device to the guest window upon the launching of the guest window.

In still another embodiment, the at least one peripheral input device, from which input is assigned to the guest window, is selected by user input.

In still another embodiment, the host desktop environment comprises a plurality of display devices, and the designated area comprises at least a portion of one of the display devices. In a further embodiment, the designated area comprises an entire display area of the one of the display devices.

In still another embodiment, the method further comprises displaying an input directive illustrating an input device command; identifying one of at the least one peripheral input device inputting the input device command; and whereby the assigning further comprises assigning input received from the identified peripheral input device to the guest window. In a further embodiment, the input device command comprises clicking and dragging of a displayed graphical object.

In still another embodiment, the method further comprises providing an interface in the host desktop environment for executing a command for controlling graphical output to the guest window. In a further embodiment, the command comprises entering a URL within a browser presented in the guest window.

In still another embodiment, the processing structure is configured to run a single application within the guest window, and wherein the input is provided as input exclusively to the single application.

In still another embodiment, the guest window has an always-on-top configuration relative to the host desktop environment.

In still another embodiment, a pointer associated with the input associated with the host desktop environment is hidden if moved into the designated area.

In still another embodiment, a pointer associated with the input associated with the host desktop environment is confined to movement outside of the boundaries of the guest window.

In still another embodiment, the method further comprises following the allocating: resizing, by the processing structure, any window currently displayed in the host desktop environment so as to not be obscured by the guest window.

In still another embodiment, the method further comprises adjusting, by the processing structure, a screen saver of the host desktop environment to not operate within the boundaries of the guest window.

There is also provided a computer-readable medium having embodied thereon a program for multi-user computing, in accordance with the above method and its embodiments. Accordingly, in another aspect, there is provided a computer-readable medium having embodied thereon a program for multi-user computing, the program comprising instructions which, when executed, carry out: detecting, by processing structure of a host computing device running a host operating system and presenting graphical output of the host operating system in a host desktop environment on at least one display device, at least one peripheral input device in communication with the host computing device; allocating, by the processing structure, a designated area of the host desktop environment for displaying a guest window; presenting, by the processing structure, a guest window within the designated area; and assigning, by the processing structure, input received from the at least one peripheral input device to the guest window, such that the input from the at least one peripheral input device does not affect a remaining area of the host desktop environment that lies outside of the designated area, the remaining area of the host desktop environment and the guest window being displayed simultaneously.

There is also provided a system for multi-user computing, in accordance with the above method and its embodiments. Accordingly, in still another aspect, there is provided a system for multi-use computing comprising: a host computing device comprising processing structure; at least one display device in communication with the host computing device; and at least one peripheral input device in communication with the host computing device, wherein the processing structure is configured to run a host operating system and to present graphical output of the host operating system in a host desktop environment on the at least one display device, the processing structure being further configured to: allocate a designated area of the host desktop environment for displaying a guest window; present a guest window within the designated area; and assign input received from the at least one peripheral input device to the guest window, such that the input from the at least one peripheral input device does not affect a remaining area of the host desktop environment that lies outside of the designated area, the remaining area of the host desktop environment and the guest window being displayed simultaneously.

In still another aspect, there is provided a method of multi-user computing comprising: detecting, by processing structure of a host computing device running a host operating system, devices in communication with the host computing device for supporting a guest user, the devices comprising a multiseat connection device, and at least one peripheral input device and at least one peripheral display device, the devices being configured to enable user interaction with the host operating system; launching, by the processing structure, an instance of a guest operating system; assigning, by the processing structure, the multiseat connection device, and supporting devices housed therein to the guest operating system; and configuring, by the processing structure, device drivers running within the guest operating system for supporting any of the supporting devices and the peripheral devices in communication with the multiseat connection device, for enabling the guest user to use the guest operating system.

In one embodiment, the first and guest operating systems are run by the processing structure of the host computing device simultaneously.

In another embodiment, at least one of the launching, assigning and configuring is carried out by an additional processing structure of a server computing device in communication with the host computing device.

In still another embodiment, the launching is carried out upon receiving a generation command from a user interacting with the host operating system.

In still another embodiment, the method further comprises ending the user session of the guest operating system; and assigning, by the processing structure, the multiseat connection device, and the supporting devices housed therein to the host operating system; configuring, by the processing structure, device drivers running within the host operating system for supporting any of the supporting devices and the peripheral devices in communication with the multiseat connection device, for enabling access to the host operating system.

In still another embodiment, the ending is carried out upon receiving a termination command from a user.

In still another embodiment, the host computing device comprises a host display device, wherein the supporting devices comprise a display adapter, and wherein the configuring further comprises configuring the display adaptor to display graphical output of the host operating system on the host display device.

In still another embodiment, the supporting devices comprise a display adapter, and wherein the configuring further comprises configuring the display adapter to display graphical output of the host operating system on the at least one peripheral display device.

In still another embodiment, the method further comprises displaying any of a user authentication interface and a user session selection interface on the at least one peripheral display device.

In still another embodiment, the method further comprises continuing the instance of the guest operating system upon cease of communication between the at least one peripheral device and the host computing device.

In still another embodiment, the host computing device comprises a host display device, the method further comprising: allocating a portion of the display device for displaying a graphical output of the guest operating system.

In still another embodiment, the host operating system is an open source operating system and the guest operating system is a non-open source operating system.

In still another embodiment, the host operating system is a non-open source operating system and the guest operating system is an open source operating system.

In still another embodiment, the multiseat connection device is identified by at least one unique identifier that is stored in memory that is in communication with the processing structure.

In still another embodiment, the at least one unique identifier is any of a MAC address, an IP address, a USB path, a USB bus, a USB device ID, a PCI device ID, a device ID, a device serial number, a device manufacturer name, a device type and a configuration of attached devices.

In still another embodiment, the method further comprises a plurality of multiseat connection devices, each of the multiseat connection devices being in communication with a respective peripheral input device and a respective peripheral display device, wherein pairing between the multiseat connection devices and their respective peripheral devices is stored in memory that is in communication with the processing structure.

In still another embodiment, the supporting devices comprise a display adapter, and wherein the display adapter is configured as the display adapter for the instance of the guest operating system.

In still another embodiment, the method further comprises in response to input by the guest user into the user session selection interface, launching, by the processing structure, another instance of the guest operating system; assigning, by the processing structure, devices previously assigned to the guest user to the guest operating system; and configuring, by the processing structure, the device drivers running within the guest operating system for supporting any of the devices previously assigned to the second user, for enabling the guest user to use the guest operating system.

In still another embodiment, prior to the configuring, the at least one peripheral input device and at least one peripheral display device are unconnected to the multiseat connection device.

In still another embodiment, the method further comprises communicating, by the processing structure, the unique identifier from the host operating system to the guest operating system.

In still another embodiment, the method further comprises discovering, by a discovery agent native to the secondary operating system, the supporting devices housed within the multiseat connection device.

In still another embodiment, the method further comprises a plurality of multiseat connection devices, each of the multiseat connection devices being in communication with a respective peripheral input device and a respective peripheral display device, and wherein the launching comprises launching a guest operating system instance for each the multiseat connection device, the assigning comprises assigning each the multiseat connection and the respective peripheral devices to a respective instance of the guest operating system.

In still another embodiment, the method further comprises configuring, by the processing structure, the host operating system to display a message on the at least one peripheral display device; and configuring, by the processing structure, the host operating system to receive input commands from the at least one input device.

In still another embodiment, the message comprises any of an authentication screen, a user session selection screen, a screensaver, instructions or help messages, a progress indicator, a status indicator, an error message, a screen locked message, an advertising message, a signage message, a remote display connection to a thin-client server, and a web-browser.

In still another embodiment, the selected guest operating system instance launched and/or configured by the processing structure is based on user input in response to an authentication screen or the user session selection screen.

In still another embodiment, the method further comprises, in response to input by the guest user into the user session selection interface, launching, by the processing structure, another instance of the guest operating system; assigning, by the processing structure, devices previously assigned to the guest user to the guest operating system; and configuring, by the processing structure, the device drivers running within the guest operating system for supporting any of the devices previously assigned to the second user, for enabling the guest user to use the guest operating system.

In still another embodiment, the guest operating system instance launched by the processing structure is based on a unique identity of a multiseat connection device stored in memory that is in communication with the processing structure.

In still another embodiment, the guest operating system is a thin-client operating system that is configured to enable user interaction with a remote desktop session running on an additional server computing device via a remote desktop protocol.

In still another embodiment, the method further comprises a plurality of multiseat connection devices, each of the multiseat connection devices being in communication with a respective peripheral input device and a respective peripheral display device, some of the multiseat connection devices and their respective peripheral devices being assigned to the host operating system.

In still another embodiment, the method further comprises, following the launching: assigning, by the processing structure, a virtual default display adapter to the at least one peripheral display device, wherein the virtual default display adapter is configured to provide output to a display adapter housed within the multiseat connection device by means of a hook display driver, the hook display driver being configured to mirror the virtual default display adapter.

In still another embodiment, the method further comprises displaying information pertaining to operation and status of the guest operating system on a display device in communication with the host computing device.

In still another embodiment, the method further comprises providing an interface in the host operating system for executing a command for controlling the guest operating system.

In still another embodiment, the command comprises any of startup and shutdown of the guest operating system.

In still another embodiment, configuration settings for the guest operating system are stored in memory that is in communication with the processing structure, and the method further comprises: configuring, by the processing structure, the instance of the second operating system according to the configuration settings.

In still another embodiment, the method further comprises ending the instance of the guest operating system upon detection, by the processing structure, of any of: powering off of the at least one peripheral display device, powering off of the multiseat connection device, disconnection of the multiseat connection device from the host computing device, receiving an input command from the guest user of the guest operating system, the command being any of an end-session command and a specialized keystroke sequence, and receiving an input command from an administrator.

In still another embodiment, the end-session command is any of a logout command, a switch user command and a shutdown command.

In still another embodiment, the launching is initiated by detecting, by the processing structure, receiving an input command.

In still another embodiment, the at least one peripheral input device is a touch sensor component of a touch screen, and the at least one peripheral display device is a display component of the touch screen.

There is also provided a computer-readable medium having embodied thereon a program for multi-user computing, in accordance with the above method and its embodiments. Accordingly, in still another aspect there is provided a computer-readable medium having embodied thereon a program for multi-user computing, the program comprising instructions which, when executed, carry out: detecting, by processing structure of a host computing device running a host operating system, devices in communication with the host computing device for supporting a guest user, the devices comprising a multiseat connection device, and at least one peripheral input device and at least one peripheral display device, the devices being configured to enable user interaction with the host operating system; launching, by the processing structure, an instance of a guest operating system; assigning, by the processing structure, the multiseat connection device, and supporting devices housed therein to the guest operating system; and configuring, by the processing structure, device drivers running within the guest operating system for supporting any of the supporting devices and the peripheral devices in communication with the multiseat connection device, for enabling the guest user to use the guest operating system.

There is also provided a system for multi-user computing, in accordance with the above method and its embodiments. Accordingly, in still another aspect there is provided a system for multi-user computing comprising: a host computing device comprising processing structure running a host operating system; and devices in communication with the host computing device for supporting a guest user, the devices being configured to enable user interaction with the host operating system, the devices comprising a multiseat connection device, at least one peripheral input device, and at least one peripheral display device wherein the processing structure is configured to: detect the devices; launch an instance of a guest operating system; assign the multiseat connection device, and supporting devices housed therein, to the guest operating system; and configure device drivers running within the guest operating system for supporting any of the supporting devices and the peripheral devices in communication with the multiseat connection device, for enabling the guest user to use the guest operating system.

BRIEF DESCRIPTION OF THE DRAWINGS

Embodiments will now be described more fully with reference to the accompanying drawings in which.

DETAILED DESCRIPTION OF THE EMBODIMENTS

Figure 1:
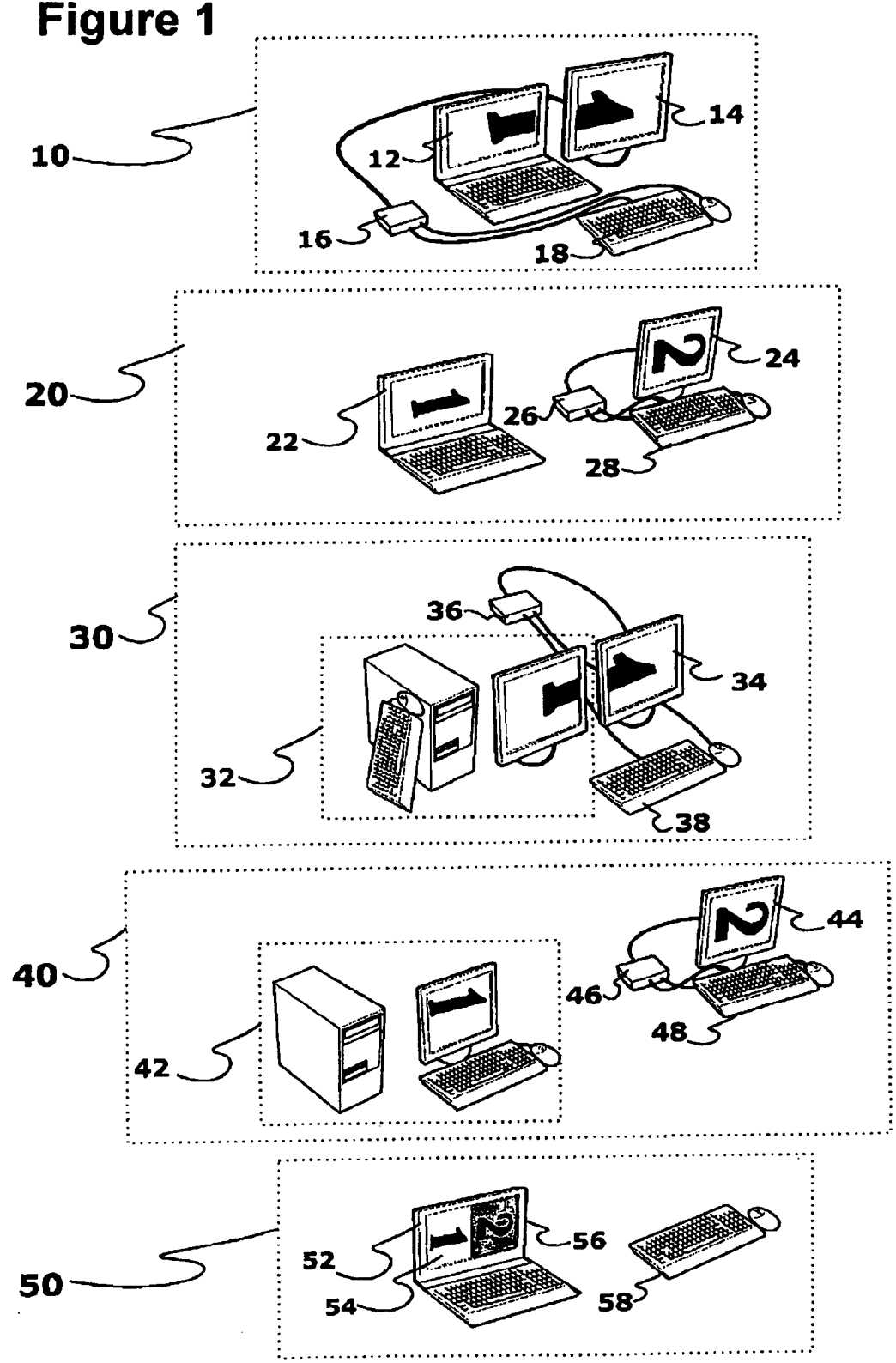
FIG. 1 is a perspective view of applications of one embodiment of the invention.
Figure 10:
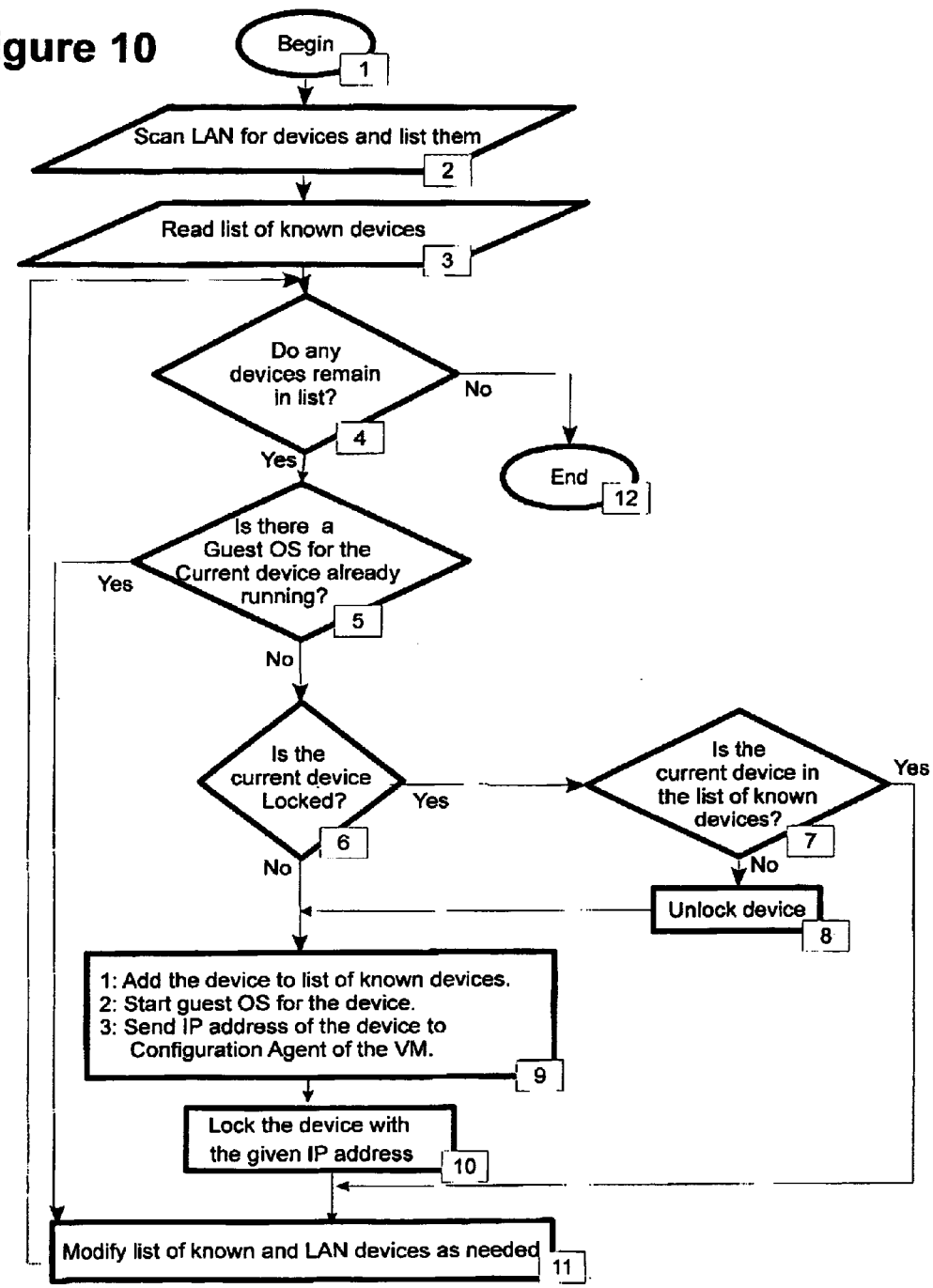
FIG. 10 is a flow chart of a second embodiment.
Figure 12:
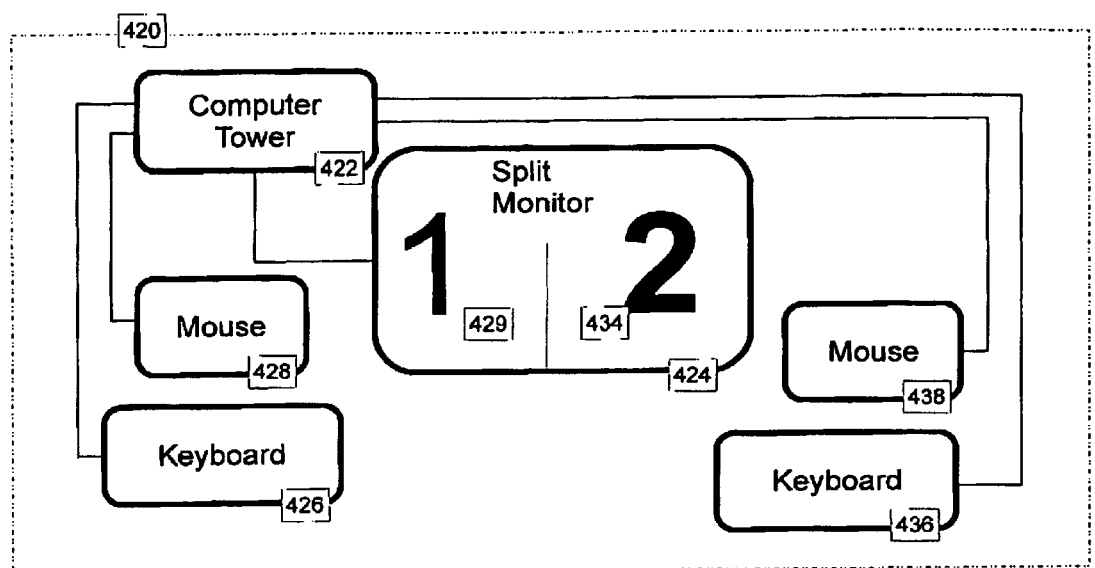
FIG. 12 is a block diagram of a fourth embodiment.

In a first embodiment, the invention enables a computer typically for use by a single user to be temporarily switched into a mode in which it can then be used by two users simultaneously. Turning to FIGS. 1, 10 and 12 illustrate the invention being used to switch from conventional extended desktop multi-display device single user computer, involving a single user with a screen extended across at least two display devices to multi-user use where two users operate simultaneously and independently using the same host computing device. In 10, A dual-display device laptop configured for extended desktop use; a single laptop computer, 12, is extended by adding a multiseat connection device, 16, in communication with assorted peripheral devices, including input devices, 18 (external keyboard and mouse) and an additional display device, 14, being a display device. The user's desktop environment has been extended such that it spans both the laptop display and the additional display device, 14, to form an extended desktop display.

The multi-user (dual-user) laptop, 20, shows the same set up as in FIG. 10, but in this case the user of the laptop, 22, has allowed a second user to assume control of the attached input devices, 28, and display device, 24, still connected to the laptop via the multiseat connection device 26, to share the processor of the laptop, 22. The software in this invention allows the transition from a single user to more than one user to take place without interrupting the work of the first user.

At 30 a desktop computer, 32, to which are attached via the multiseat connection device 36 input devices, 38 and two display devices, 34, with an extended display. At 40 the first users system is shown as 42, but the second display device, 44 is now associated via the multiseat connection device 46 with additional input devices, 48, this creating a computing station for the second user running simultaneously on the processor if the single computer. Again such a transition may be made without interrupting the first user.

50 shows a third application of the same embodiment in this case where only a single display device is involved. On the addition of a second user as shown in this view the display device screen is divided the left hand side, 54, being accessed by the first user and the right hand side, 54, being accessed by the second user employing the input devices, 58.

Figure 2:
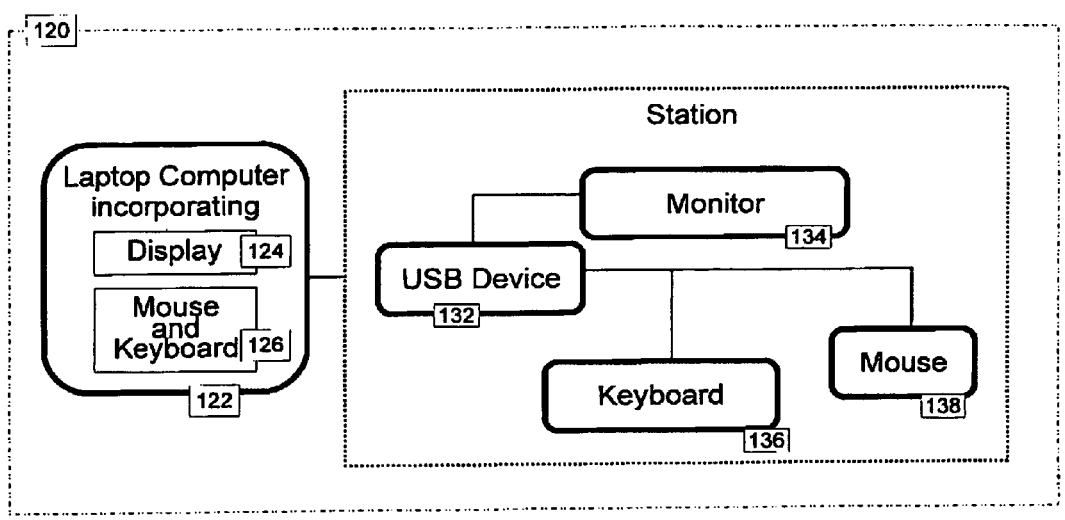
FIG. 2 is a block diagram of a multi-user computing system.

Turning now to FIG. 2, a block diagram of a multiple-user computing system is shown and is generally indicated by reference numeral, 120. System, 120 comprises a host computing device, 122 that is configured to run a host operating system (Host OS) during use. The host computing device, 122 comprises processing structure (not shown) running the Host OS, a host display, 124, and at least one host input device, 126. In the embodiment shown, the host computing device 122 is a laptop computer comprising a display, and the host input device 126 is a keyboard.

The host computing device 122 is in communication with a multiseat connection device 132 via a wired connection and which is configured to communicatively couple to a plurality of peripheral devices. The peripheral devices are Universal System Bus (USB) devices, and comprise at least one display device and at least one input device. In the embodiment shown, the wired connection is via USB, the multiseat connection device, 132, is an IIP T150 USB multiseat connection device the peripheral devices include a secondary display device 134, a secondary keyboard 136 and a secondary mouse device 138.

The processing structure of the host computing device 122 is configured to run a guest operating system (Guest OS) for accommodating a user of the peripheral devices, and to allow at least one peripheral display device and at least one peripheral input device to be operated by the user as a "zero-client" station using the Guest OS, so as to accommodate the user as a guest user. The Guest OS is run simultaneously and in parallel with the Host OS, and in a manner such that the computational power of the processing structure is shared by the two simultaneously run operating systems. In this embodiment, the Host OS is a non-open source-based operating system, such as for example a Microsoft™ Windows™-based OS, and the Guest OS is an open source-based operating system, such as for example a Linux™-based operating system.

The processing structure of the host computing device 122 is generally configured to transfer assignment of the peripheral devices between the Host OS and a Guest OS, as needed, to create or dissolve each of the "zero-client" stations.

Generally the host computer keeps track of attached devices and offers the user(s) options as to the way in which ambiguities involved in allocating input and output devices to groupings to form zero-client stations may be made. Once such a grouping has been established the host OS may offer options as to the operating system to be used to create the zero-client station; in other situations the OS to be used by the guest station may be fully determined without offering choice. The processing structure of the host computing device 122 either uses a currently running OS or generates an instance of a guest OS, and assigns the available peripheral display device and the available peripheral input device to that OS instance, thereby creating the "zero-client" station. The "zero-client" station may then be operated by the guest user.

If a request to dissolve the zero-client station is received by the processing structure of the host computing device 122, the host OS assigns the devices that constituted the zero-client station to the host OS and if no other stations are using that guest OS it terminates the guest OS instance. The peripheral input devices become available for assignment to another guest OS, as needed. A request to dissolve the "zero-client" device may be made, for example, by a user of the "zero-client" device upon execution of a shut-down command within the guest OS.

Figure 3:
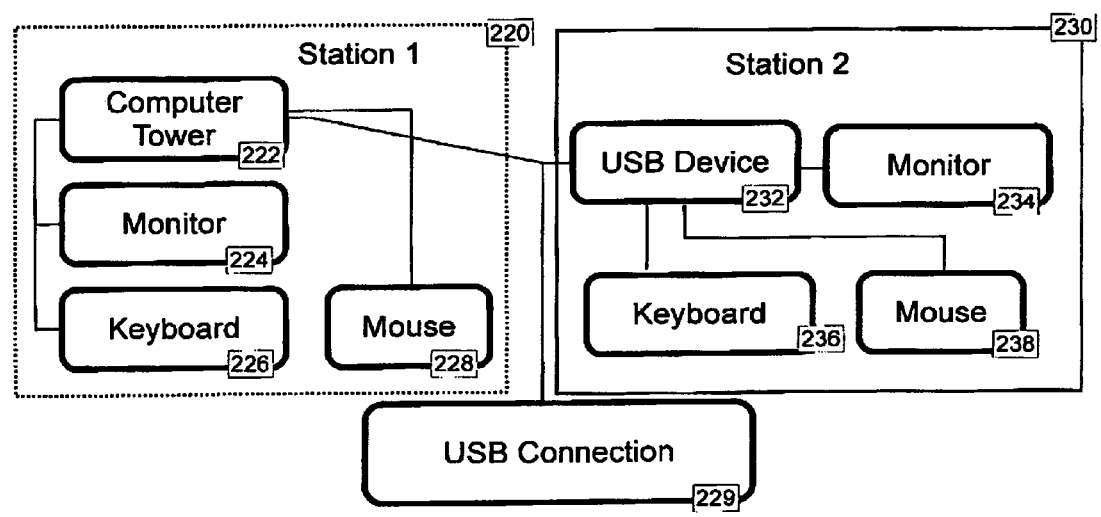
FIG. 3 is a further block diagram.

The multi-user computing system is not limited to the configuration described above, and in other embodiments, other system configurations may be used. For example, FIG. 3 further illustrates this embodiment in a multiple-user computing system, and which is generally indicated by reference numeral 220. System 220 comprises a host computing device 222 that is configured to run a host OS during use. The host computing device comprises processing structure (not shown) running a host OS, and further comprises a host display 224 and at least one host input device 226. In the embodiment shown, the host computing device 222 is a desktop computer, the host display 224 is a computer display device, and the host input devices are, 226, a keyboard and, 228, a mouse. Together these constitute Station1

The host computing device 222 is in communication with at least one secondary computing device 230, via an USB connection to a multiseat connection device, to which are connected a secondary display, a computer display device 234 and secondary input devices, 236 is a keyboard and 237 a mouse. This grouping constitutes a zero-client station connected via USB connection, 229. In this particular instance the host station is running a Linux OS and the guest OS for station 2 is a non-open source-based operating system, such as for example a Microsoe Windows™-based OS.

Figure 4:
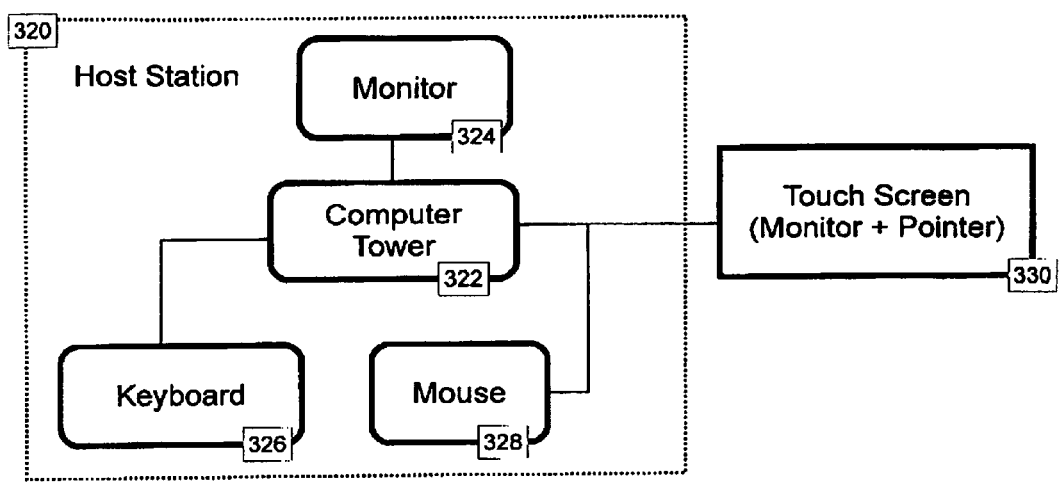
FIG. 4 is a third block diagram.

Yet other forms of implementation exist. For example, FIG. 4 shows another embodiment of a multiple-user computing system, and which is generally indicated by reference numeral 320. System 320 comprises a host computing device 322 that is configured to run a host OS during use. The host computing device comprises processing structure (not shown) running a host OS, and further comprises a host display 324 and at least one host input device 326. In the embodiment shown, the host computing device 322 is a desktop computer, the host display 324 is a computer display device, and the host input devices are 326 a keyboard and 328 a mouse.

The host computing device 322 is in communication with at least one secondary device 330. In the embodiment shown, the secondary device is a touch screen 330 which combines in itself both the functions of display and pointing. In this embodiment it connects to the host computer via USB. In the particular instance shown the host OS is Windows 7 and the guest OS is Linux.

Figure 5:
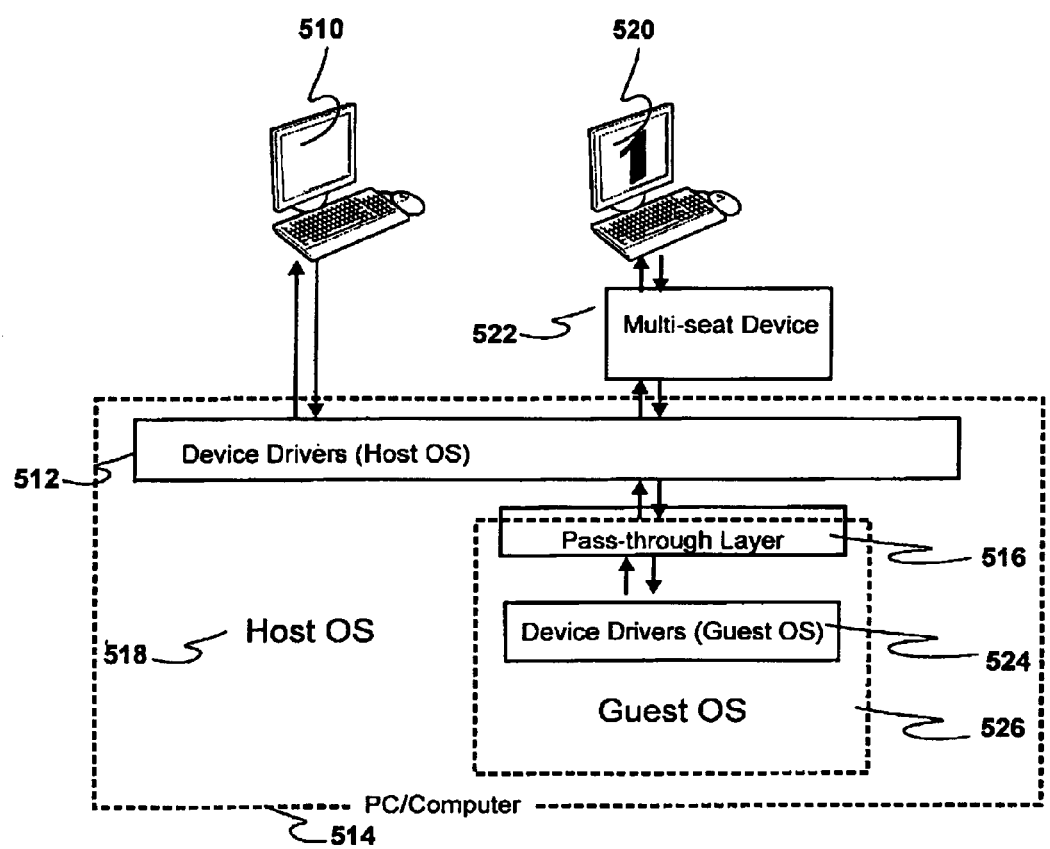
FIG. 5 is another block diagram.

FIG. 5 is a schematic diagram further illustrating this embodiment. The host computing device consists of a host computer, 514, running a host OS, 518, with attached input and display devices, 510. These devices, 510 are directly attached to the host computer and operate using the device drivers of the host OS, 512. The first guest uses devices, 520, attached to the multiseat connection device, 522, to communicate through the host OS device drivers, 512, and a pass-through layer, 516, to the device drivers of the guest OS, 524, within the guest OS, 526.

Now in a second embodiment the use of a Virtual Desktop Interface, VDI, of the invention is illustrated in the following Figures.

This application describes unique methods of making guest operating systems independently operable by directly connecting input devices and display adaptors to these guest operating system instances by means of multiseat connection devices configured by a host operating system. Method of enabling host operating system and multiple guest OS instances to run simultaneously each addressed by their own dedicated input devices. There are basically two ways utilized by this application to achieve access between the virtualized operating system and the zero client devices:

One involves connecting the multiseat connection device via USB where USB pass-through of the devices (e.g., the graphics adaptor, USB ports, peripherals such as keyboard, and mouse) is used. USB Pass-through makes a USB device attached to the host PC appear directly as a USB device attached to guest virtual machine, and the second approach is uses Ethernet connected multiseat connection devices, in the case of network based devices where the virtualized operating system can talk directly to the devices via an Ethernet connection without the need or overhead of USB pass-through.

In one embodiment multiple guest operating system images reside on the hard-disk of the host computing device. The processing structure of the host operating system determines which one of these guest operating system images to launch based on user input at a login or authentication screen. Multiple different operating system instances can be launched and operated at once via multiple MultiSeat connection devices. These guest operating system instances could be full "fat client" operating systems or even "thin-client" guest operating system instances. In the situation of a fat client guest operating system image the system boots and runs its own end user applications running on within the guest operating system. In the situation of a thin-client guest operating system image, the thin-client guest OS image boots would be configured to connect to a remote server thus enabling a user to interact with a remote desktop session running on that separate server in communication with the guest (thin-client) operating system instance via a remote desktop protocol (such as VNC, RDP, SPICE, etc.).

In one variation the specific guest operating system instance that is launched is determined by the processing structure is based on user input. For example the user may enter their user name or select amongst a list of available guest operating system images from a authentication or selection screen. In this situation the selected guest operating system would be launched in accordance with the input provided at the session selection screen.

In an additional variation of the invention the host operating system could also be configured to enable multiple users to login at once to the single running instance of the host operating system. Thereby provide many different types of user sessions for users logged into the host OS via MultiSeat connection devices; these could be provided along side guest operating system instances. With the guest operating system instances there would be a 1:1 ratio between guest operating system and multiseat connection devices; in contrast the host operating system could support many simultaneous MultiSeat connection devices with just a single host operating system instance. Different types of user experiences or messages could be displayed on the display devices connected to these multiseat connection devices, including an authentication screen, a user session selection screen, a screensaver, instructions or help messages, a progress indicators, a status indicator, an error message, a screen locked message, an advertising message, a signage message, a remote display connection to a thin-client server, and a web-browser or even a full logged in user session.

Since in this invention multiseat connection devices behave much like independent computers, the invention envisages ways of starting and stopping sessions. For example a session can be started by an input command, by powering on a MultiSeat connection device, by powering on the at least one peripheral display device. Conversely the user session can be ended by powering off of the at least one peripheral display device, or powering off of the multiseat connection device, or disconnecting the multiseat connection device from the host computing device, or receiving an input command from the guest user of the guest operating system, such as an end-session command or a specialized keystroke sequence (such as ctrl+alt+del) or receiving an input command from an administrator such as clicking to shutdown a session via an administrative control panel. In addition, by the processing structure, the user of the host operating system can input commands to shutdown or to start the guest operating system.

When devices are connected to MultiSeat connection devices that are attached to the host computing device via a USB connection. The processing structure, detects when new devices are connected and intelligently determines based on assignment of the multiseat connection devices and by examining the tree structure of the devices descending from the MultiSeat connection device and intelligently and automatically maps any child devices descending from the MultiSeat connection device to the guest operating system instance corresponding to said MultiSeat connection device.

In a further embodiment it is envisioned that guest operating systems may be connected to and disconnected from multiseat connection devices while the guest operating system instance is already running. In this embodiment the guest operating system can be configured to utilize a virtual display adapter as its default display adaptor, the real display adaptor being connected and removed from the guest operating system dynamically. Wherein the virtual default display adapter is configured to provide output to a display adapter housed within the multiseat connection device by means of a hook display driver, the hook display driver being configured to mirror the virtual default display adapter, thereby enabling it to be removed and added to an already running guest operating system.

In another embodiment of the invention a running application outputs messages to a display connected to the first operating system relating to the operation and status of the guest operating system. This application is in communication with the guest operating system by the processing structure.

Figure 6:
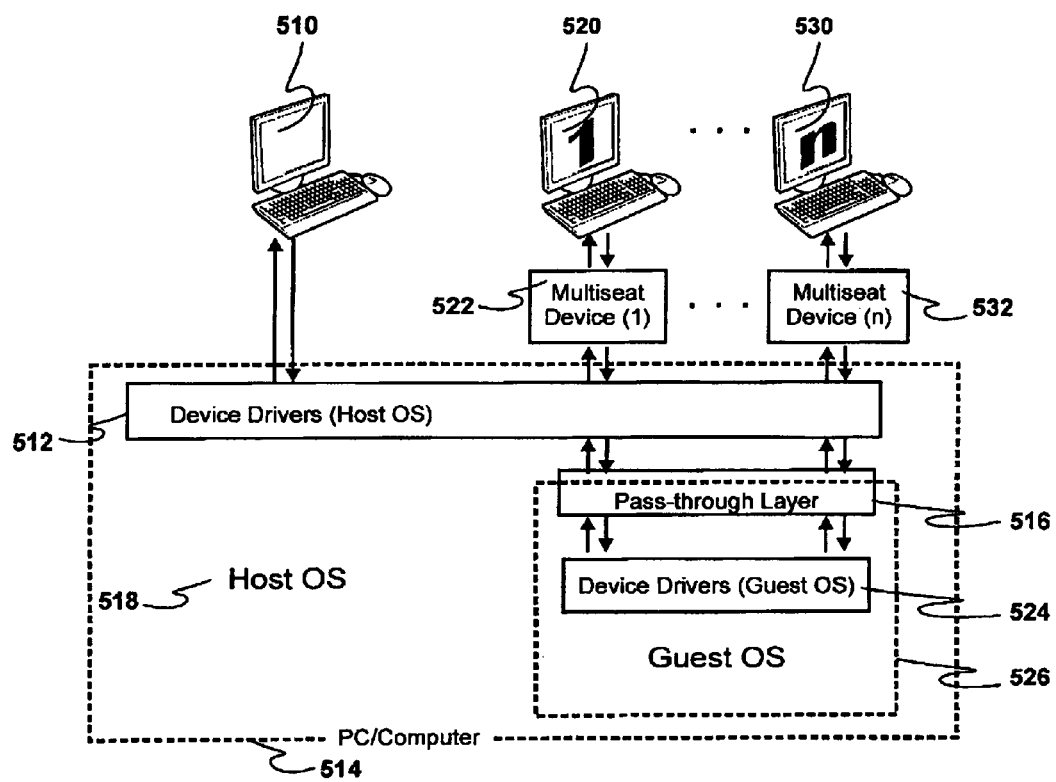
FIG. 6 is a block diagram of a second embodiment.

FIG. 6 is a schematic illustrating the embodiment in which all of the additional users are operating through the same guest OS using VDI. The host computing device consists of a host computer, 514, running a host OS, 518, with attached input and display devices, 510. These devices, 510 are directly attached to the host computer and operate using the device drivers of the host OS, 512. The first first guest uses input devices, 520 attached to the multiseat connection device, 522, to communicate through the host OS device drivers, 512, and a pass-through layer, 516, to the device drivers of the guest OS, 524, within the guest OS, 526. The other guest stations operate in a similar way, as is illustrated by the last of these stations, 530, which operates through its own multiseat connection device, 532, through the host drivers, 512, the pass through layer, 516, to reach the device drivers of the guest OS, 526.

Figure 7:
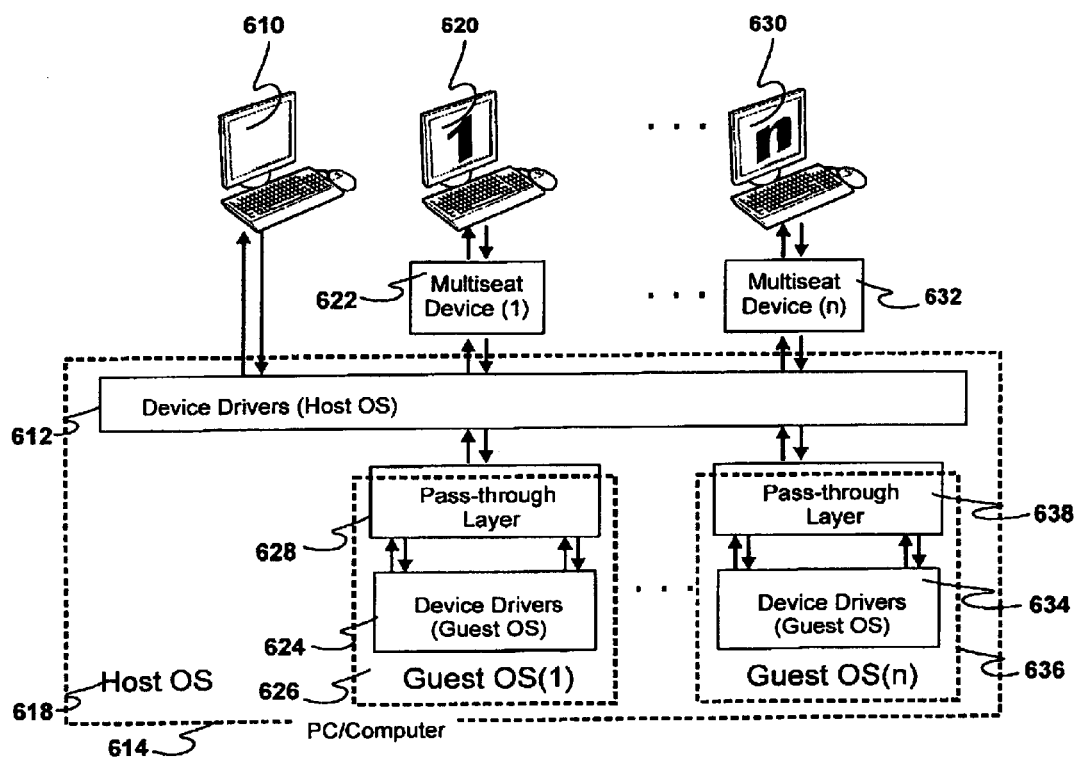
FIG. 7 is another block diagram of a second embodiment.

FIG. 7 is a schematic illustrating the VDI embodiment in which all of the additional users are operating through different guest OSes. The host computing device consists of a host computer, 614, running a host OS, 618, with attached input and display devices, 610. These devices, 610 are directly attached to the host computer and operate using the device drivers of the host OS, 612. The first guest uses input devices, 620 attached to the multiseat connection device, 622, to communicate through the host OS device drivers, 612, and a pass-through layer, 628, to the device drivers of the guest OS, 624, within the guest OS instance, 626. The other guest stations operate in a similar way, as is illustrated by the last of these stations, 630, which operates through its own multiseat connection device, 632, reaching its host OS, 626, through the host drivers, 612, the pass through layer, 638, and the uses the device drivers, 634, of the guest OS, 636.

Figure 8:
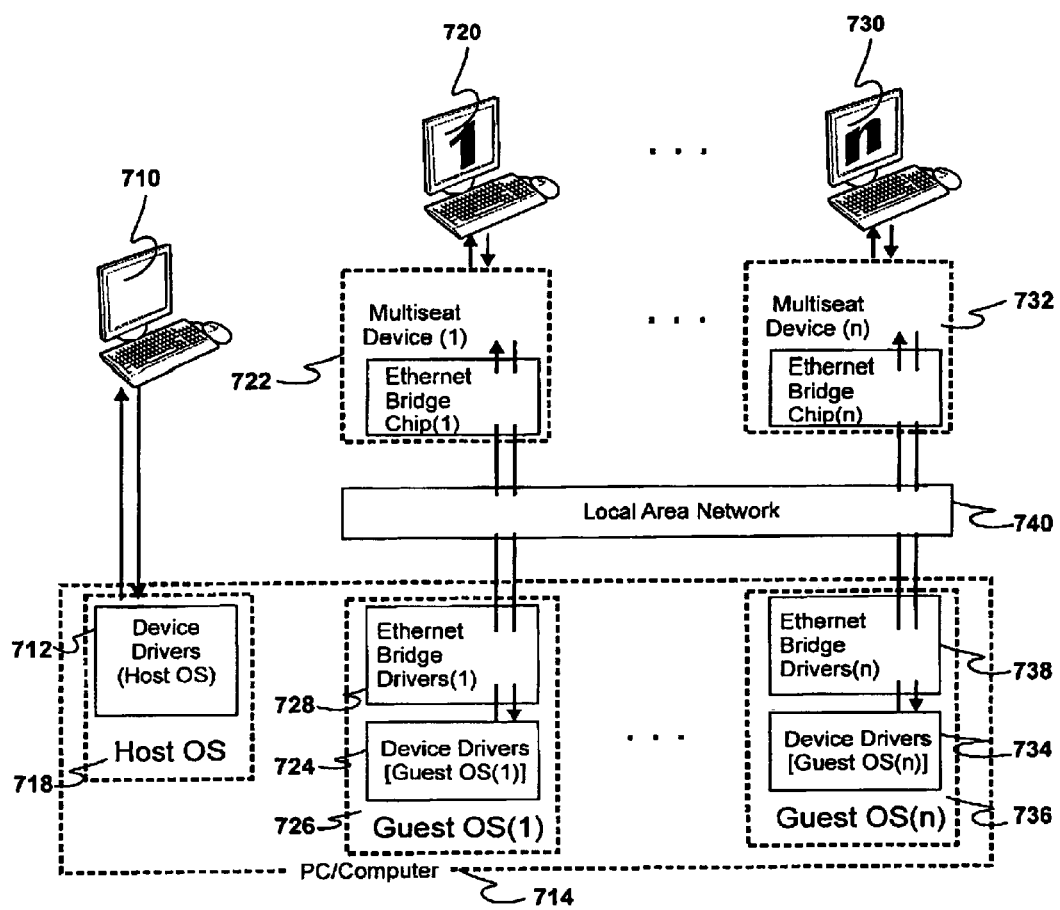
FIG. 8 is another block diagram of a second embodiment.

FIG. 8 is a further schematic illustrating the VDI embodiment in which all of the additional users are operating via a Local Area Network, LAN, through different guest OSes. The host computing device consists of a host computer, 714, running a host OS. 718, with attached input and display devices, 710. These devices, 710 are directly attached to the host computer and operate using the device drivers of the host OS, 712. The first guest uses input devices, 720, attaches to the multiseat connection device, 722, containing an Ethernet bridge chip. It communicates through the LAN, 740, and the Ethernet bridge drivers, 728, within its own guest OS, 726, with the device drivers of the guest OS, 724. The other guest stations operate in a similar way, as is illustrated by the last of these stations, 730, which attaches to the multiseat connection device, 732, containing an Ethernet bridge chip. It communicates through the LAN, 740 and the Ethernet bridge drivers, 738, within its own guest OS, 736, to the device drivers of the guest OS, 734

Figure 9:
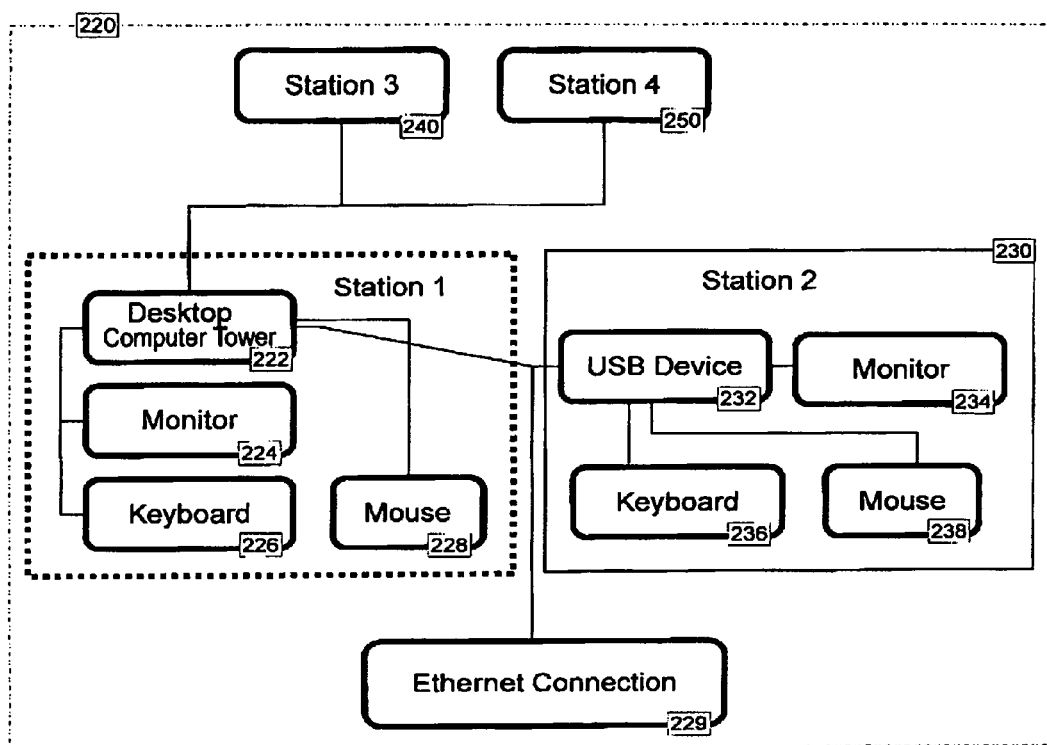
FIG. 9 is another block diagram of second embodiment.

FIG. 9 shows is a block diagram of the VDI embodiment of a multiple-user computing system, and which is generally indicated by reference numeral 220. System 220 comprises a host computing device, 222, that is configured to run a host OS during use. The host computing device comprises processing structure (not shown) running a host OS, and further comprises a host display 224 and at least one host input device 226. In the embodiment shown, the host computing device 222 is a desktop computer, the host display 224 is a computer display device, and the host input devices are, 226, a keyboard and, 228, a mouse. Together these can be viewed as Station1

The host computing device 222 is in communication with at least one secondary computing device 230. In the situation illustrated communication is via an Ethernet connection 229 and an Ethernet to USB huh, to which are connected a secondary display, a computer display device 234 and secondary input devices, 236, is a keyboard and, 237, a mouse. This grouping constitutes a zero-client station connected via Ethernet. In addition FIG. 2 shows a third zero-client station (details not displayed), 240, and a fourth zero-client station (details not displayed), 250, both connected via USB to the host computer. In this particular instance the host station is running a Linux OS and station 3 is running on that OS. Station 2 is running using the Windows Vista OS and Station 4 is running using the Windows XP OS.

FIG. 10 is a flowchart outlining the method for setting up the guest OSes in an implementation of the VDI implementation. The chart flows as follows: Scan the local area network and list all zero client devices available at (2). Using this list generate the subset of these which are "known" that is are listed with their IP addresses (3). Select the next of the LAN devices on the list. If there is no next next device on the list (4) then process finishes at (12). Ascertain if there is a guest OS already running for that device (5), if there is ensure that it is on the list of known devices (11). If the device is locked check to see if it is known if it is proceed through (11) otherwise unlock it (8) and add it to the flow of unlocked devices to (9). Where the OS for the device is started, the IP address is sent to the configuration agent and the device is added to the list of known devices. Next Lock the device (10). Finally at (11) check the listing for new devices and add them as needed before examining the list for the next device (3).

Figure 11:
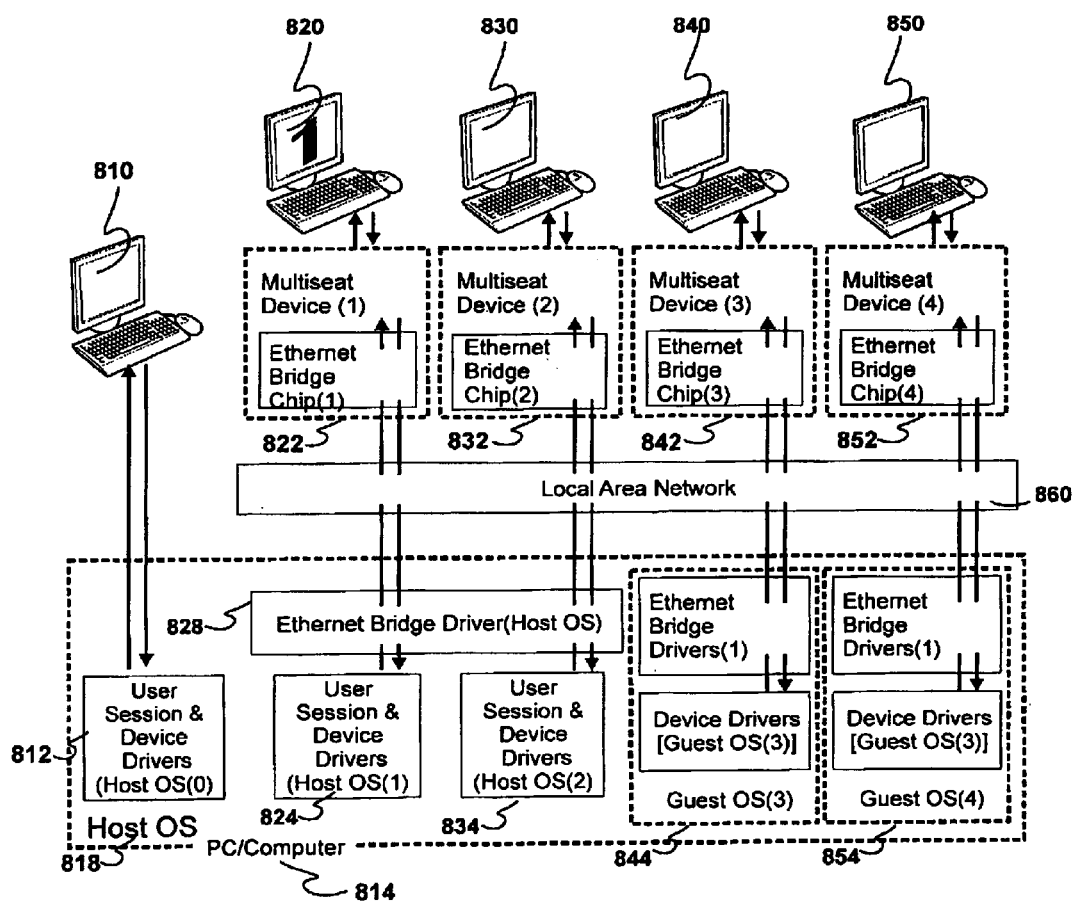
FIG. 11 is a block diagram of a third embodiment.

A further implementation of the invention involves the host OS presenting login screens on multiple multiseat connection devices the guest OS instances are launched after login in response to user choice of OS. This embodiment is illustrated by FIG. 11. The figure shows a host terminal, 810, and four guest terminals, 820, 830, 840 and 850, operating through their respective bridge devices 822, 832, 842 and 852, to communicate with the host computer over the LAN 860. Two of these 820 and 830 are bridged through the host OS, 818, to their user sessions and device drivers 824 and 834. These two terminals have displayed on their screens the login requirements and options. The other two guest terminals 840 and 850 are already operating on their specific host OSes, 844 and 854.

A final embodiment of the invention lies in implementation according to Claim ## (Nesting guest output within the host's window), the nested embodiment. This is displayed in block diagram form in FIG. 12, and is generally indicated by reference numeral 420. System 420 comprises a host computing device processing structure (not shown) running a host OS, and further comprises a host display 424 and at least one host input device 426. In the embodiment shown, the host computing device 422 is a desktop computer, the host display 424 is a computer display device, and the host input devices are, 426, a keyboard and, 428, a mouse. The host computing device, 422, is in communication with one or more peripheral devices. In the embodiment shown, the peripheral devices are USB devices, and comprise a secondary keyboard, 436, and a secondary pointer device, 438, both of which are in communication with the processing structure of the host computing device 422 via USB ports.

The processing structure of the host computing device 422 is configured to constrain the output from the primary system to a segment of the display device(s), 429, and open an application window, 434, for the secondary devices within a dedicated portion of the display device(s) to create a guest console. According to this method there is not necessarily a guest OS involved, the window being part of the host OS output. Additionally in this method it is not required that the guest be a zero client (without a processing device of its own). In the case illustrated the display device is one single display device which is split into side-by-side portions the primary zero-client station using the left hand side, 429, and the secondary zero-client station employing the right hand side, 434, as its output device. In the event that the guest station logs out the host station will return to using all of the display display device. The same software can be used with the host user allowing a guest user to open a window on one of the several display devices available to the host.

The invention also envisages creation of multi-user computing environment in situations in situations where there might just be one display device connected to the computer, or where it is preferable for the guest user to interact within the windowing environment of the host user, rather than have the display adaptor passed through to a guest operating system.

This application describes a method for creating a second application window occupying a designated area (which can either be a portion of a display device or a whole display device) within a host desktop environment that can be independently operated by an additional user via one or more dedicated input devices. Here the guest user operates a guest window (a "secondary console" which is really just a specialized application window which could either display the output of a guest operating system instance or display the output. In its most minimal form this method requires just a second pointing device (in terms of additional hardware) to be added after which this invention allows simultaneous use of a single computer display device.

Once the software is installed, and an extra mouse (and optionally also a keyboard) are added to the computer, moving between guest window mode (two users) and a single user mode is rapid and interferes minimally with the host user. This invention may be employed in two hardware configurations, the first with an added display device, the second by sharing the single computer display device.

In the two display device configuration the single user employs the display devices form a large extended desktop (improving productivity), and in Nested Secondary Console mode both users have desktops across a whole display device.

In the single display device configuration the single user uses all of the display device, but in Nested Secondary Console mode each user is restricted to a portion of the single display device.

The method involves:

Sizing the App Window:

Launching the guest's application window covering the designated area within the host windowed desktop environment;

Optimizing the Host Desktop:

Making changes to the window behaviour of host desktop environment to ensure that the simultaneous interaction and use by an additional user is minimally disruptive on the host user;

Assigning Devices:

Determining which specific input or other devices and/or trees of devices to pass-through to the guest console, giving the guest user dedicated private access to, and control of, these specific devices; and Listening and Responding to Input Events:

Launching an application or guest OS whose output is displayed within this application window.

Since a portion of the host computing device's standard desktop has been allocated as the output display area for guest window, certain optimization features are required to improve usability when this guest window is in operation.

The guest window consists of an application window with dedicated input devices enabling simultaneous use of a host computing device by an additional user. Inside this application window a software application or guest operating system instance is rendered within the window in such a way that it listens dedicatedly to the input devices associated with the console. Input device pass through from the Host operating system directly to the application (e.g., a browser) or to the guest operating system.

Traditionally a windowing layer receives input events and passes them to the individual applications.

In this new model the application window itself responds to the input commands generated by the input devices assigned to it. Application listens to and interprets raw input events from, for example, the mouse and keyboard and interprets these and passes these input commands directly to the application thereby bypassing the windowing layer of the operating system, the computational overhead of an additional logged in user, and also thereby not interfering with the mouse and focus of the host desktop environment and the usability of the host computer user.

In its simplest implementation this can be done for touchscreen applications where no pointer cursor is required, just pointing events. For other scenarios involving a traditional mouse, a secondary pointer or mouse cursor would also need to be created within this application window (FIG. 13, 922; FIG. 14, 936)

Of the two approaches to providing a guest window within the host desktop environment, the "application" approach (compared with the guest operating system instance approach), has faster performance as it operates at full native speed of the Host OS, it occupies a much smaller footprint as a second operating system is not required (smaller download, occupying less disk space and less system memory) and behaves identically to instances of the running application on the host PC.

Figure 13:
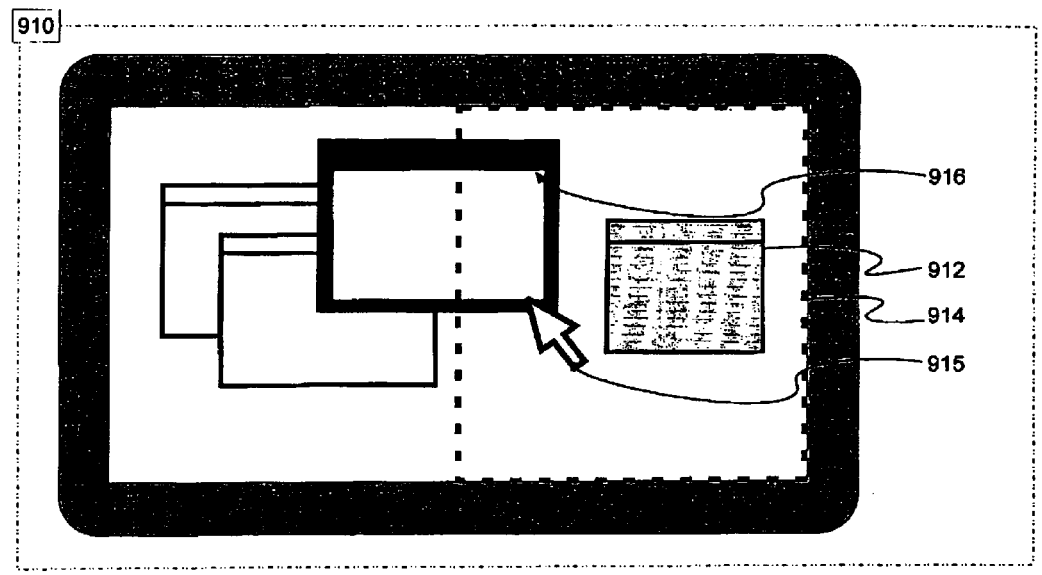
FIG. 13 is another view of a fourth embodiment.
Figure 13:
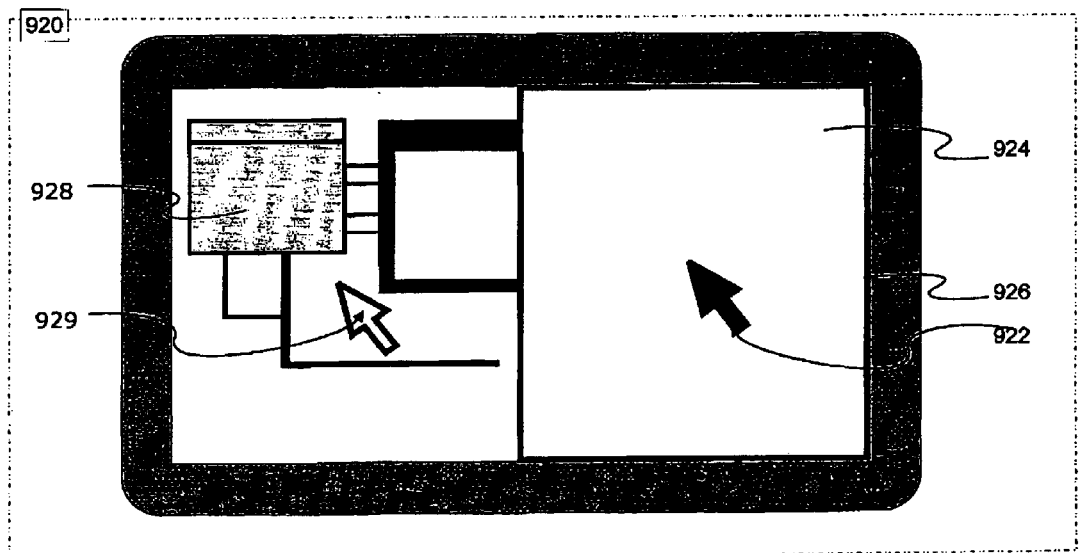
Figure 14:
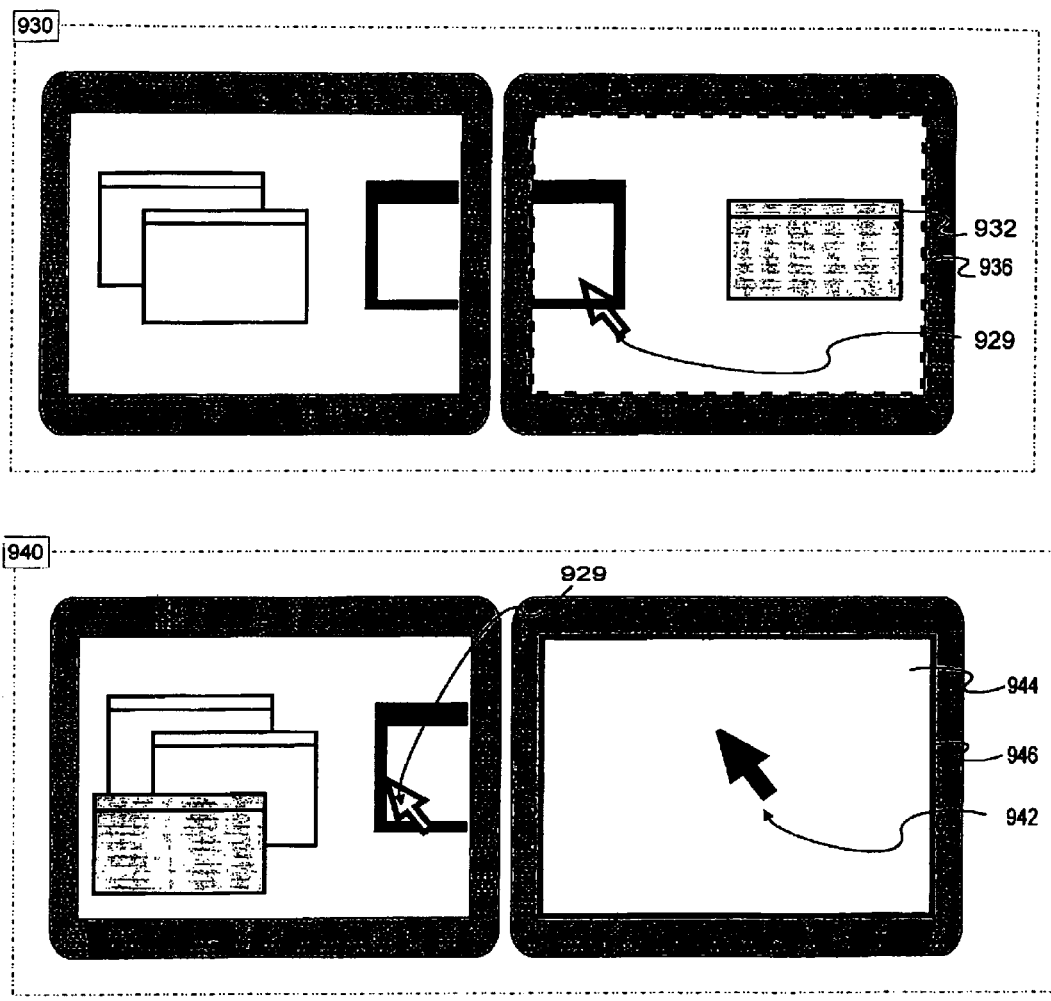
FIG. 14 is another view of a fourth embodiment.

FIG. 13 shows two screen views of the nested embodiment as it occurs with a single display device. The display in the upper half of the figure, 910 represents the situation in which a single user is present, but also represents the area which will be devoted to the guest window, 914. Some application windows, 912 lie entirely within the area to allocated to the guest and others, 916, overlap, but do not lie within. The pointing device, 915, is within the area designated for the guest. The display, 920 in the lower half of the figure represents the situation immediately after the second user is incorporated. The guest window, 924, has been overlaid on the right hand side of the screen covering portions of the host's application windows in so far as they overlap. The application window lying completely within the guest area has been moved to reside completely within the host's window, 928, and the host pointer, 929, has been moved and constrained to lie within the restricted host window. The guest's pointing device, 922, is displayed in the guest window.

FIG. 14 shows two screen views of the nested embodiment as it occurs with two display devices. The display in the upper half of the figure, 930 represents the situation in which a single user is present, in this particular embodiment both the host and the guest are to have their own display devices, the guest having the right hand one, 936. Some application windows, 932 lie entirely within the area to allocated to the guest and others, 936, overlap, but do not lie within. The display, 940 in the lower half of the figure represents the situation immediately after the second user is incorporated, the guest window, 944, occupies the right screen and the host's overlapping windows are only partially displayed in the left display device. The application window lying completely within the guest area has been moved to lie within the host's display device and the host pointer, 929, has been constrained to lie within the left display device. The guest's pointing device, 942, is displayed in the guest window.

Although in embodiments described above, the host computing device is in communication with a multiseat connection device via a wired USB connection, in other embodiments, the host computing device may alternatively be in communication with the multiseat connection device via a wireless connection or an Ethernet connection or some other connection protocol.

Although in embodiments described above, the host OS is a non-open source operating system and the guest OS is an open source operating system, in other embodiments, the host OS may alternatively be an open source operating system and the guest OS may alternatively be a non-open source operating system.

Although in embodiments described above, the host computing device is in communication with a multi seat connection hub via a wired connection, in other embodiments, the host computing device may alternatively be in communication with the multiseat connection hub via any of a wireless connection and an Ethernet connection.

Although embodiments described above referred to wired connections, in other embodiments, one or more connections may alternatively be wireless.

Although embodiments have been described above with reference to the accompanying drawings, those of skill in the art will appreciate that variations and modifications may be made without departing from the spirit and scope thereof as defined by the appended claims.

What is claimed is:

1. A system for multi-user computing comprising:
   a host computing device comprising a processing structure;
   at least one display device in communication with the host computing device; and
   at least two peripheral input devices in communication with the host computing device, wherein the processing structure is configured to run a host operating system and to present graphical output of the host operating system, within a host desktop environment, on the at least one display device, the processing structure being further configured to:

allocate a designated area of the host desktop environment for displaying a guest window;
present a guest window within the designated area, the remaining area of the host desktop environment and the guest window being displayed simultaneously;
run a guest operating system simultaneously with the host operating system, the graphical output of the guest operating system being presented in the guest window;
assign input received from at least one peripheral input device to the guest operating system;
upon termination of a guest session, delete the guest window being displayed on the at least one display device; and
re-allocate the entirety of the at least one display device for displaying the host desktop environment.

2. The system of claim 1, wherein the processing structure is further configured to:
check a registry of predefined peripheral input devices;
determine if the at least one peripheral input device detected during said detecting comprises at least one predefined peripheral input device; and
assign the at least one predefined peripheral input device to the guest window upon said launching of the guest window.

3. The system of claim 1, further comprising a plurality of display devices upon which the host desktop environment is displayed, wherein the designated guest window area comprises an entire display area of at least one of said plurality of display devices and others of said display devices continuing to display the host desktop environment.

4. The system of claim 3, wherein
the display adaptors controlling the at least one of said plurality of display devices being removed from the host desktop environment;
the host operating system's desktop environment being reduced in size to no longer span said display devices;
the display adaptors being configured by the processing structure and the guest operating system to be directly output to by the graphics drivers of the guest operating system, and exclusively display graphical output from the guest operating system; and
the host desktop environment being re-sized to span only those display devices remaining within the host desktop environment,
Upon termination of said guest session, said display adaptors being returned to control of the host operating system and the host operating system's desktop environment being expanded in size to span the additional display devices.

5. The system of claim 1, wherein the processing structure is further configured to:
display an input directive illustrating an input device command;
identify one of at the least two peripheral input devices inputting said input device command; and
wherein said assigning further comprises upon receipt of said input command from the identified device assigning input received from the identified peripheral input device to the guest window.

6. The system of claim 5, wherein the input device command comprises clicking and dragging of a displayed graphical object.

7. The system of claim 1, wherein the processing structure is further configured to run a single application within the guest window, and wherein said input is provided as input exclusively to said single application.

8. The system of claim 1 wherein the processing structure is further configured to apply any of the following changes following said detecting:
allocate a reconfigured area of the at least one display device for displaying the host desktop environment;
hide a pointer associated with the input associated with the host desktop environment if moved into the designated area;
enforce an "always-on-top" configuration of the guest window relative to the host desktop environment;
confine a pointer associated with the host desktop environment to movement outside of the boundaries of the guest window;
following said allocating, re-size any window currently displayed in the host desktop environment so as to not be obscured by the guest window; and
adjust a screen saver of the host desktop environment to not operate within the boundaries of the guest window.

9. A system for multi-user computing comprising:
a host computing device comprising a processing structure running a host operating system; and
devices in communication with the host computing device for supporting multiple guest users, the devices being configured to enable user interaction with the host operating system, the devices comprising multiple multiseat connection devices, supporting at least one peripheral input device, and at least one peripheral display device,
Wherein the processing structure is configured to:
detect the devices by a discovery agent native to the host operating system;
configure the host operating system to enable independently operable user terminals by displaying messages on the at least one peripheral display device and receiving input commands from the at least one input device;
launch an instance of a guest operating system;
assign ones of the supporting devices housed within the multiseat connection device, to the guest operating system;
configure device drivers running within the guest operating system for supporting ones of the supporting devices and the peripheral devices in communication with the multiseat connection device, for enabling the guest user to use the guest operating system via the multiseat connection device and associated peripherals; and
subsequent to termination of the user session re-assign supporting devices previously assigned to the guest operating system back to the host operating system for enabling access to the host operating system from said supporting devices.

10. The system of claim 9, wherein the host operating system is configured by the processing structure to directly output messages to the at least one peripheral display device, display over-top of the guest operating system to aid in configuration or using the system.

11. The system of claim 9, wherein the processing structure is configured to carry out said launching upon receiving a login or session selection command from a user interacting with the host operating system via a multiseat connection device.

12. The system of claim 9, wherein devices being configured to display a message and receive input commands to enable user interaction with the host operating system are configured by the processing structure to display on the at least one peripheral display device any of:
a user authentication interface;
a user session selection interface;
a full screen browser session;

a splash screen;
a video; and
an independently operable desktop environment.

13. The system of claim 9, wherein the multiseat connection device is identified by at least one unique identifier that is stored in memory that is in communication with the processing structure and wherein the at least one unique identifier is any of an integer number, a username, a MAC address, an IP address, a USB path, a USB bus, a USB device ID, a PCI device ID, a device ID, a device serial number, a device manufacturer name, a device type, and a configuration of attached devices.

14. The system of claim 13, further comprising a plurality of multiseat connection devices, each of the multiseat connection devices being in communication with a respective peripheral input device and a respective peripheral display device, wherein pairing between the multiseat connection devices and their respective peripheral devices is stored in memory that is in communication with the processing structure.

15. The system of claim 9, wherein the supporting devices further comprise a display adapter, and wherein the display adapter is configured as the display adapter for the instance of the guest operating system.

16. The system of claim 12, wherein the processing structure is configured to:
in response to input by the guest user into the user session selection interface, launch an instance of a guest operating system;
assign devices previously assigned to the guest user within the host operating system to the newly launched guest operating system; and
configure the device drivers running within the guest operating system for supporting any of the devices previously assigned to the host operating system, for enabling the guest user to use the guest operating system via the multiseat device.

17. The system of claim 13, wherein the processing structure is configured to:
communicate the unique identifier from the host operating system to the guest operating system.

18. The system of claim 9, further comprising a plurality of multiseat connection devices, each of the multiseat connection devices being in communication with a respective peripheral input device and a respective peripheral display device, and wherein said launching comprises launching a guest operating system instance for multiples of said multiseat connection devices, said assigning comprises assigning multiples of said multiseat connection devices and said respective peripheral devices to a respective instances of the guest operating system;
others of said multiseat connection devices and their respective peripheral devices remaining assigned to the host operating system to enable independently operable user terminals.

19. The system of claim 9, wherein the message displayed on the to independently operable user terminals comprises any of:
an authentication screen;
a user session selection screen;
a screensaver;
instructions or help messages;
a progress indicator;
a status indicator;
an error message;
a screen locked message;
an advertising message;
a signage message;
a remote display connection to a thin-client server;
a full-screen kiosk; and
a web-browser.

20. The system of claim 9, wherein the type of user session launched and/or configured by the processing structure for display on the at least one display device is based on any of:
user input in response to an authentication screen;
user input in response to session selection screen;
the unique identity of a multiseat connection device stored in memory that is in communication with the processing structure.

21. The system of claim 9, wherein the processing structure is configured to end the user session upon detection, by the processing structure, of any of:
powering off of the at least one peripheral display device,
powering off of the multiseat connection device,
disconnection of the multiseat connection device from the host computing device,
receiving an input command from the guest user, the command being any of:
an end-session command;
a switch user command;
a logout command;
a shutdown command; and
a specialized keystroke sequence.

22. The system of claim 9, wherein the at least one peripheral input device is a touch sensor component of a touch screen, and the at least one peripheral display device is a display component of the touch screen.

23. The system of claim 9, wherein the multiseat connection device is in communication with the computing device via any of
an Ethernet connection;
a USB over Ethernet connection;
a wired connection;
a Wireless connection; and
a USB connection.

24. The system of claim 9, wherein the multiseat connection device includes an USB eEthernet bridge chip enabling the operating systems connecting to this bridge chip to communicate with the USB devices behind the Ethernet bridge chip, as if they were directly connected to the USB bus of the computer.

* * * * *